United States Patent
Farooq

(12) 
(10) Patent No.: US 7,654,597 B1
(45) Date of Patent: Feb. 2, 2010

(54) SIDE IMPACT ARM REST RETRACTING MECHANISM

(76) Inventor: S. Iskander Farooq, 25252 Sullivan La., Novi, MI (US) 48375

( * ) Notice: Subject to any disclaimer, the term of this patent is extended or adjusted under 35 U.S.C. 154(b) by 0 days.

(21) Appl. No.: 12/265,814

(22) Filed: Nov. 6, 2008

(51) Int. Cl.
*B62D 39/00* (2006.01)
(52) U.S. Cl. .................. 296/1.09; 296/153; 297/411.2; 297/115
(58) Field of Classification Search ............... 296/1.09, 296/153, 187.05; 297/216.1, 411.2, 411.3, 297/411.32, 411.33, 227, 411.37, 115, 116, 297/117
See application file for complete search history.

(56) References Cited

U.S. PATENT DOCUMENTS

2002/0105217 A1* 8/2002 Khedira et al. ......... 297/411.32
2004/0100122 A1* 5/2004 Bornchen et al. ........... 296/153
2004/0108751 A1* 6/2004 Scheidmantal et al. . 296/187.05
2007/0013220 A1* 1/2007 Crossman et al. ........ 297/411.3

FOREIGN PATENT DOCUMENTS

| DE | 10244506 | 4/2004 |
|---|---|---|
| EP | 1612096 | 1/2006 |
| WO | WO 2006/120527 | 11/2006 |

\* cited by examiner

*Primary Examiner*—Lori L Lyjak
(74) *Attorney, Agent, or Firm*—Frank MacKenzie; Ford Global Technologies, LLC

(57) ABSTRACT

An armrest retracting mechanism for host vehicle armrests during side impact vehicle collision events.

4 Claims, 4 Drawing Sheets

SIDE IMPACT ARM REST RETRACTING MECHANISM

TECHNICAL FIELD

Side impact collisions are occurrences wherein relatively minor impacts can cause occupant injuries. Usually, a side impact in the vehicle compartment area causes deformation of the external panels, which often translates into deformation of occupant area panels such as door trim, A-pillars, B Pillars and the like. Such deformation can cause the trim components on door panels, or other interior components to contact the occupant. Being restrained by seat restraints does not permit the occupant to move or be moved out of the way from such deflecting trim, thereby causing injury to the occupant. One such trim article is the arm rest on a door panel. As the door deflects in response to the impact, the arm rest will contact the occupant, usually at the hip or rib level, resulting sometimes in serious injury. There is a need for a mechanism that will attenuate arm rest travel during a side impact or retract a door arm rest during side impact events to minimize or eliminate such injuries.

SUMMARY

In one embodiment, the present application relates to an armrest retracting mechanism for host vehicle armrests during side impact vehicle collision events. The mechanism includes a cylindrical tube having an inner and outer perimeter and a predetermined length with a central axis. The tube has a guide on the outer perimeter of the tube coaxial with each other and parallel to the central axis. A biasing element, such as a coil spring, is housed within the inner perimeter of the tube. A retractor has a first end adapted to cooperatively engage the armrest of a host vehicle and a second end adapted to be inserted through the biasing element and terminating in an attachment to compress the biasing element. The retractor element has a shoulder intermediate the first and second end to cooperatively engage a second retainer to retain the attachment in compressed position of the biasing element. The mechanism may further include a rod adapted to be inserted in the guide and extends for a predetermined length. The rod has a first end adapted to receive a retaining clip and a second end adapted to receive a washer or a disc. The rod will to cooperatively engage in response to side impact of the vehicle and cause the retaining clip to disengage from the retractor and permit the biasing element to decompress and retract the armrest.

DETAILED DESCRIPTION

Figure 2:
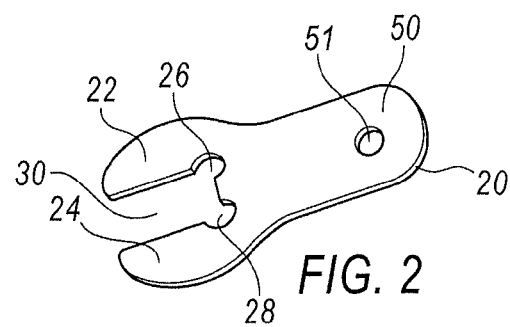
FIG. 2 is a perspective view of the retainer clip showing its construction.
Figure 1:
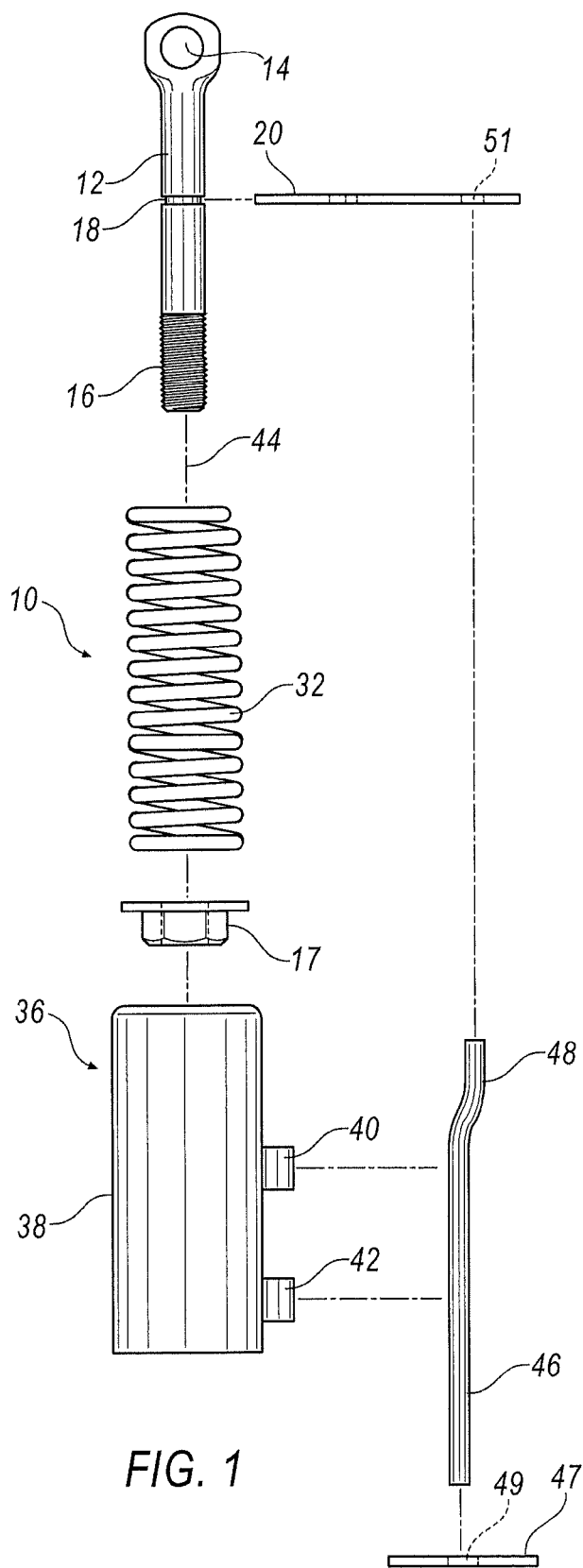
FIG. 1 is an exploded view of on embodiment of the arm rest retractor mechanism showing its construction.
Figure 3:
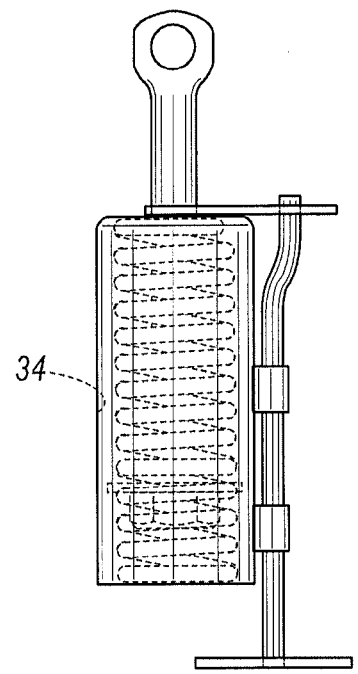
FIG. 3 is a side view of the embodiment of the arm rest mechanism of FIG. 1 showing it as a constructed unit.

Turning now to the drawings wherein like numbers refer to like structures, and particularly to FIGS. 1, 2 and 3, there is shown therein an arm rest retractor mechanism 10 having a retractor 12 with an eyelet 14 at one end and a threaded portion 16 at its opposite end. The retractor has a retraining groove 18 intermediate the eyelet and the threaded end, to accommodate the spring retaining clip 20 in a manner to be described. The retaining clip is comprised, in this embodiment, has having two opposed jaws 22 and 24, that are insert able over the retaining groove, and have biasing features 26 and 28, that permit the jaws to be biased away from each other in order to accommodate the groove in the retractor, yet force the jaws back toward each other once the spring clip is in place in the groove to secure the clip in place on the groove. Thus, it can be understood that the opening 30 in the retaining clip is slightly smaller that the diameter of the retractor body at the groove.

A coil spring 32 is provided that is insert able into the interior diameter 34 of the tube body 36. The retaining body is reciprocally insert able in the axial position relative to the spring and the tube so that the retractor, when compressed and held in place by the retaining clip and the nut and washer, is reciprocally moveable in the tube body in response to force in a manner to be hereinafter described.

The tube has an outer diameter 38 upon which is affixed or formed or otherwise located at least one, and, in this embodiment, two, guides 40 and 42, respectively. The guides parallel with the central axis 44 of the tube and are used to guide the rod 46 in a path parallel to the central axis in response to a collision force. If one guide is used, it should be of sufficient length to permit the guide rod to travel a path substantially parallel to the central axis of the tube. The rod is equipped at one end with an anvil 47, shown as a circular disc or washer that is equipped with a centrally located aperture 49 that accommodates the diameter of the rod 46. At its opposite end, the rod is equipped with a dog leg portion 48 that is adapted to interact with flange 50 on the retainer spring. The flange 50 may further be equipped with an aperture 51 that accommodates the dog leg portion diameter to ensure that the dog leg portion is always in contact with the flange. Those skilled in the art will readily understand that any way to ensure consistent interaction with the spring clip is contemplated, and that FIGS. 1, 2 and 3 describes only one such possibility.

FIG. 3 shows the arm rest retracting mechanism of FIG. 1 in an assembled mode. The assembled arm rest retracting mechanism is inserted, as an assembled unit, into a vehicle door as set forth in FIG. 3. When assembled, the spring is compressed within the tube between the retaining clip and the nut with washer to present a spring loaded mechanism.

Figure 4:
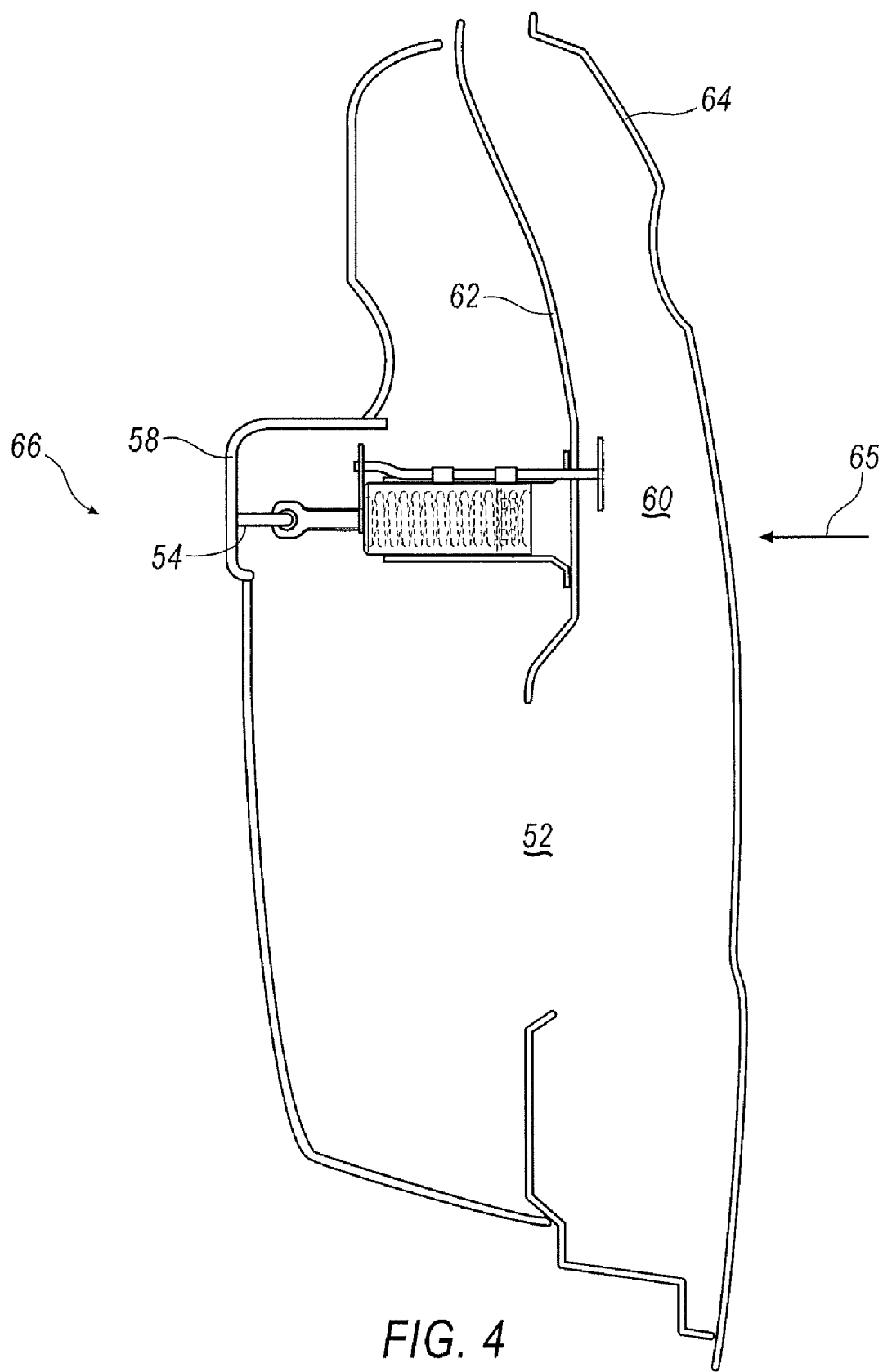
FIG. 4 is a cutaway on end view of a vehicle door showing one embodiment of the arm rest retractor mechanism in place with an arm rest.

Turning to FIG. 4, there is shown therein a cut away on side view of a vehicle door 52 showing the arm rest retracting mechanism packaged inside the door. Specifically, the eyelet on the retractor is affixed to a complimentary attachment 54 on the arm rest 58. Notice that, in this embodiment, the anvil is positioned on the exterior side 60 of the door trim panel 62 but interior to the door outer panel 64. The spring loaded tube is located in the interior portion of the door trim panel 62. When sufficiently violent side impact collision energy 65 is directed against the door outer panel, it will deform the door outer panel to a point sufficient to have the door outer panel contact the anvil. The anvil transmits side impact collision energy through the rod to the dog shaped portion, where it will interact with the spring clip flange, and the force of the impact will overcome the retaining clip and it will disengage from the retractor; the coil spring will then decompress and the retractor will pull the arm rest away from the interior 66 of the vehicle in response to the collision.

Figure 5:
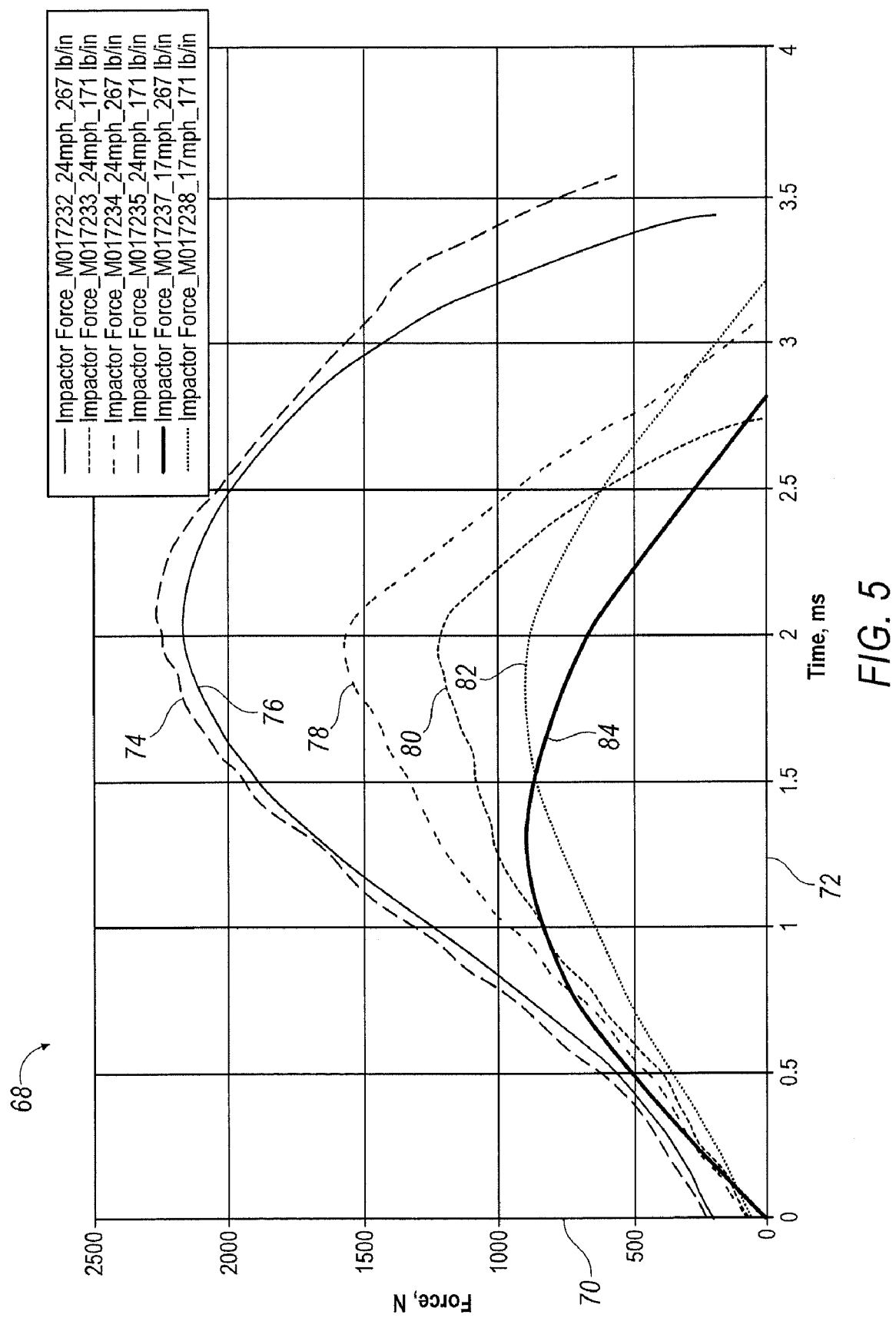
FIG. 5 is a graph showing the action of one embodiment of the arm rest retractor mechanism during an impact event.
Figure 6:
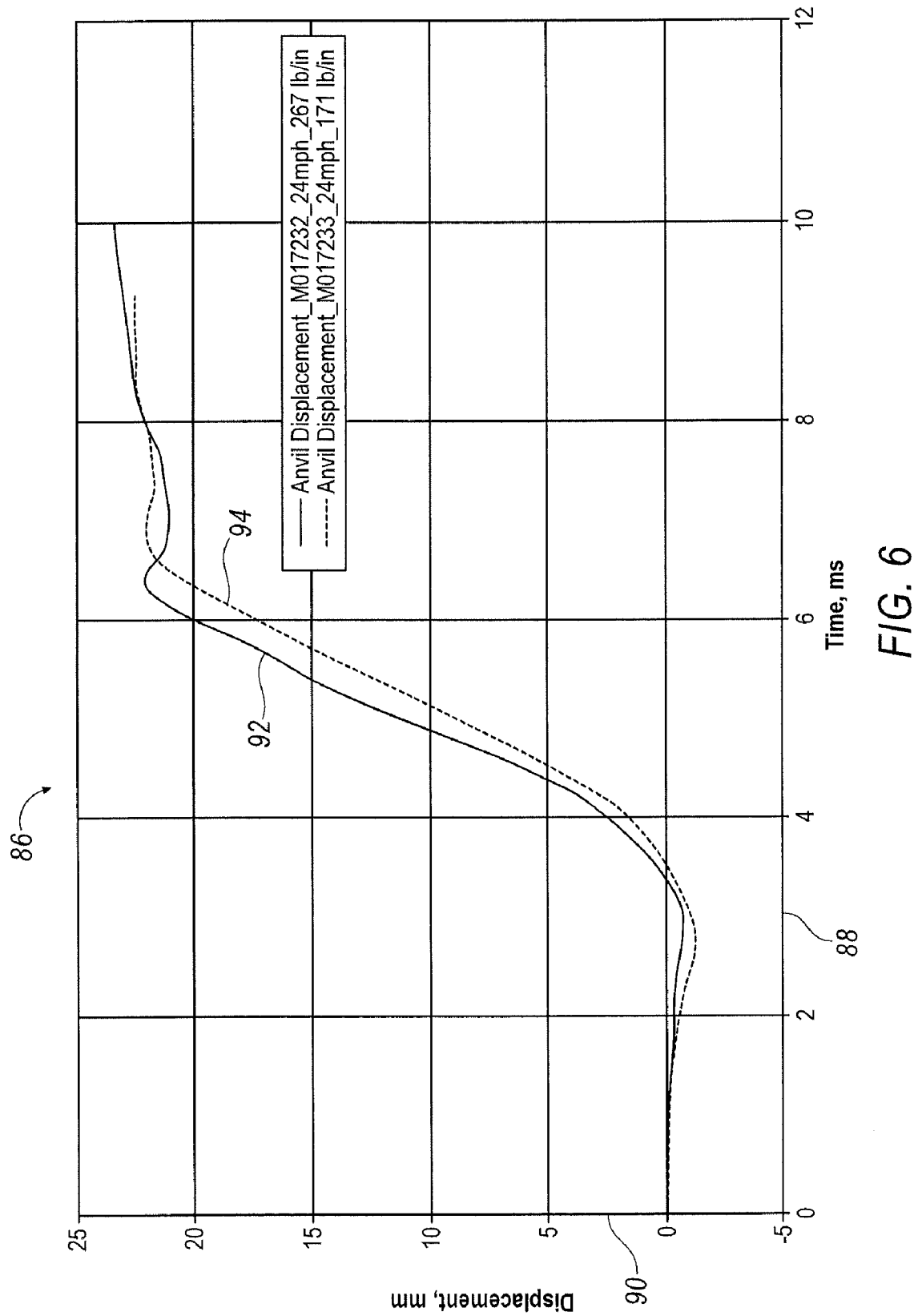
FIG. 6 is a graph showing the anvil displacement as a function of time of one embodiment of the arm rest retractor during an impact event.

FIG. 5 is a graph 68 showing the retractable arm rest mechanism action as it relates to Force exerted over time. The X axis 70 is Force as measured in Newtons, and the X axis 72 is time, in milliseconds. Each one of the curves 74, 76, 78, 80, 82, and 84 respectively, shows the force the retractable arm reset mechanism exerted on the arm rest during an impact event over time. Lines 74, 76, 78 and 80 show impactor force at 24 mph side impact, whereas line 82 and 84 show impactor force at 17 mph side impact. Notice that in each instance, the maximum force exerted on the retractable arm rest was at 2 milliseconds, and after the force was dissipated, the force exerted on the arm rest mechanism returned to the force as if it was not in a collision event. Thus, it can be understood that the retractable arm rest mechanism is responsive to the side impact collision force.

FIG. 5 is a graph 86 showing the anvil displacement as a function of time. X axis 88 is time, in milliseconds, and Y axis 90 is displacement, in millimeters. Lines 92 and 94 represent anvil displacement at 24 mph. In each instance the anvil displacement is substantially similar, and the anvil displacement is consistent through several impact events.

While the embodiment(s) have been described in the specification, those skilled in the art understand that the words used are words of description, and not words of limitation. Many variations and modifications are possible without departing from the scope and spirit of the invention as set forth in the appended claims.

I claim:

1. An armrest retracting mechanism for host vehicle armrests during side impact vehicle collision events, comprising;
   a cylindrical tube having a predetermined length with a central axis, said tube has an inner perimeter and an outer perimeter; at least one guide on the outer perimeter of the tube coaxial with each other and parallel to said central axis; the tube has one end open to be able to insert the biasing element and nut with washer; the tube has other end closed with a hole in center of sufficient enough diameter to be able to insert the retractor inside the tube;
   a biasing element housed within the inner perimeter of the tube;
   a retractor having a first end adapted to cooperatively engage the armrest of a host vehicle and a second end adapted to be inserted through the biasing element; said second end terminating in an attachment to compress the biasing element; said retractor element having a shoulder intermediate said first and second end to cooperatively engage a retaining clip to retain the attachment in cooperative engagement with the biasing element;
   a rod adapted to be inserted in said guides and extending for a predetermined length, the rod having a first end adapted to receive a retaining clip and a second end to cooperatively engage a disc or washer; the rod, in response to side impact of the vehicle, will cause the retaining clip to disengage from the retractor and thereafter retracts the armrest and permit the biasing element to decompress.

2. The armrest retracting mechanism of claim 1, wherein said biasing element is a coil spring.

3. The arm rest retracting mechanism of claim 1, wherein said retractor is a cylindrical rod equipped at its first end with a close loop eye adapted to cooperative engage a retaining pin in an arm rest and a threaded portion at its second end to accept a threaded nut and washer assembly to engage the spring; said retractor may extend for a length greater than the length off the cylindrical tube.

4. The arm rest mechanism of claim 1, wherein said rod second end has a disc or washer affixed thereto react to side impact force to retract the retractor.

* * * * *